(12) United States Patent
Sacripante et al.

(10) Patent No.: US 6,291,122 B1
(45) Date of Patent: Sep. 18, 2001

(54) POLYESTERS

(75) Inventors: Guerino G. Sacripante, Oakville; Alan E. J. Toth, Burlington; Marko D. Saban, Etobicoke, all of (CA)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/660,341

(22) Filed: Sep. 14, 2000

Related U.S. Application Data

(62) Division of application No. 09/515,125, filed on Feb. 28, 2000, now Pat. No. 6,180,747.

(51) Int. Cl.[7] .............................. G03G 9/00; C08G 63/02
(52) U.S. Cl. .................... 430/109; 528/180; 528/181; 528/185; 528/189; 528/190; 528/192; 528/193; 528/194; 528/277; 528/280; 528/300; 528/302; 528/306; 528/307; 528/308; 528/308.6; 430/110; 430/137
(58) Field of Search ..................................... 528/180, 181, 528/185, 189, 190, 192, 193, 194, 277, 280, 300, 302, 306, 307, 308, 308.6; 430/109, 110, 137

*Primary Examiner*—Samuel A. Acquah
(74) *Attorney, Agent, or Firm*—E. D. Palazzo

(57) ABSTRACT

A branched polyester resin of the Formula

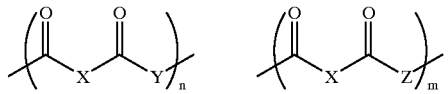

wherein n and m represent randomly repeating segments, and the number of n and m segments in the polymer backbone are each of from about 10 to about 10,000; X is an alkylene group, an olefinic group, or an arylene; Y is an organic dioxy group or radical of I, II, or mixtures thereof; Z is an organic trioxy radical of III, IV, or mixtures thereof; and wherein R and $R_1$ is a hydrogen atom or an alkyl group; G is an alkylene or arylene group, and a is 0 or 1.

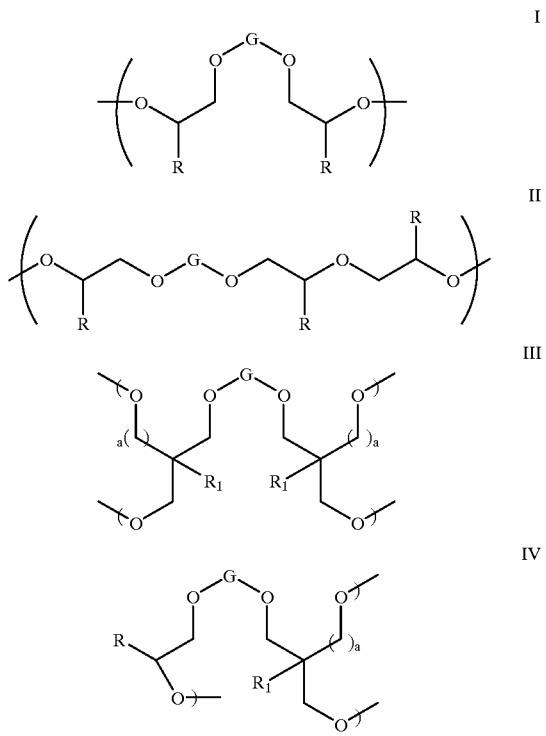

13 Claims, No Drawings

POLYESTERS

COPENDING APPLICATION

This application is a divisional of Application(s) No(s). 09/515,125, filed Feb. 28, 2000. U.S. Pat. No. 6,180,747.

Illustrated in U.S. Pat. No. 6,063,827, the disclosure of which is totally incorporated herein by reference, is, for example, a process for the preparation of an unsaturated polyester which comprises (i) reacting an organic diol with a cyclic akylene carbonate in the presence of a first catalyst to thereby form a polyalkoxy diol, and (ii) optionally adding thereto a further amount of cyclic alkylene carbonate in the presence of a second catalyst, and (iii) subsequently polycondensing the resulting mixture with a dicarboxylic acid. The appropriate components of this application can be selected for the present invention in embodiments thereof.

BACKGROUND OF THE INVENTION

The present invention is generally directed to polyester resin compositions and process thereof, and more specifically, a branched polyester, especially useful as a toner binder, and which resulting toner can be selected for imaging and printing processes. In embodiments, the polyester of the present invention is comprised of a branched polyester resin of the Formula

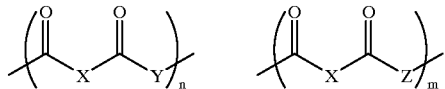

wherein n and m represent randomly repeating segments, for example the segments in ( ) are not in a particular sequence or pattern, and more specifically, represent repeating segments of the polymer backbone and randomly distributed such that the repetitive sequence of the segments n and m do not follow any algorithm, and the number of n and m segments in the polymer backbone are each, for example, of from about 10 to about 10,000 (from about to about as used throughout includes, for example, all numbers in between, such as 11, 12, 25, 100, 1,000, 5,000, 7,000), X is an aliphatic group of for example, from about 2 to about 20 carbon atoms, an olefinic group of, for example, a vinylidene group, or an aromatic group of, for example, from about 6 to about 18 carbon atoms, Y is selected from the alkoxylated bisphenol A units illustrated as groups or radicals I, II and/or III, and wherein I, II and/or III comprise, for example, a mixture of I from about 60 to 90 percent of the mixture, II from about 1 to 30 percent of the mixture, and III from about 0 to about 10 percent of the mixture; Z is selected from the branching units (p) illustrated as radicals or groups IV and V, and wherein R and $R_1$ are a hydrogen atom or aliphatic hydrocarbon, such as alkyl with from about 1 to about 20 carbon atoms, and (a) is preferably, for example, 0 or 1.

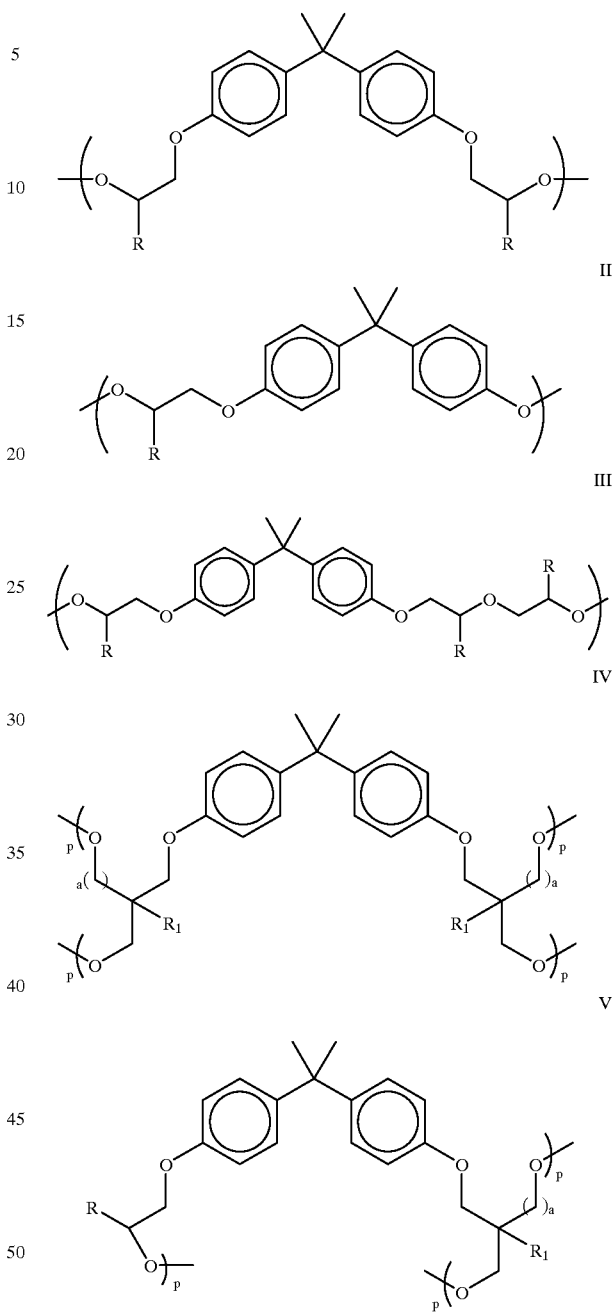

In a specific embodiment of the present invention, the branched polyester resin is derived from the polycondensation reaction of an equivalent of a diacid monomer, such as for example, fumaric acid or terephthalic acid, and an equivalent mixture of bis-alkoxylated bisphenol A with a hydroxyl number of from about 2 to about 4 illustrated herein by Formulas IX, X, XI, XII and XIII.

In another embodiment of the present invention, there is disclosed a process for the preparation of a mixture of bis-alkoxylated bisphenol A with a hydroxyl number of from about 2 to about 4 as illustrated by Formulas IX, X, XI, XII and XIII, involving the alkoxylation of bisphenol A with a cyclic alkylene carbonate in the presence of a catalyst, such as an alkali carbonate, and wherein the cyclic alkylene carbonate is, for example, an ethylene carbonate, propylene carbonate, butylene carbonate as illustrated by Formula VI, and a hydroxyl containing cyclic carbonate, such as glycerine carbonate and/or trimethylolpropane carbone, illustrated as VII and VIII, respectively.

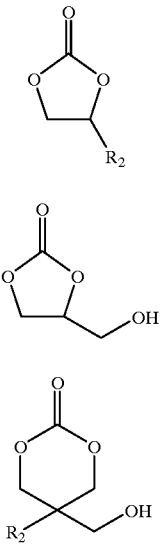

wherein $R_2$ is a hydrogen, or an alkyl group.

PRIOR ART

Polyester resins are generally prepared by a polycondensation process involving the reaction of a diol monomer and a diacid or diester monomer, and producing water or an alcohol as byproduct, which is collected by distillation. Electrophotographic toners are generally comprised of a resin, such as a polyester, a pigment and optionally a charge control agent. Many various toner formulations are known, and more specifically, one known toner formulation is comprised of a crosslinked unsaturated polyester resin, such that desirable low fixing temperatures and offset properties are attained, reference, for example, U.S. Pat. No. 5,227,460, the disclosure of which is totally incorporated herein by reference, wherein there is disclosed as one preferred unsaturated polyester resin a poly(propoxylated bisphenol co-fumarate) which is crosslinked to a gel content of up to about 40 weight percent utilizing a peroxide to provide a toner useful for electrophotographic processes.

In U.S. Pat. No. 3,590,000, an unsaturated polyester for use as a toner binder is prepared from fumaric acid and a diphenol. Similarly, in U.S. Pat. No. 4,331,755, there is disclosed an unsaturated polyester resin derived from fumaric acid and a polyol blend of propoxylated bisphenol. Furthermore, in U.S. Pat. No. 4,314,049, a polyester resin composition is generated by the reaction of a dicarboxylic acid and a polylol comprising an etherified diphenol. Additionally, U.S. Pat. No. 4,525,445 discloses an unsaturated polyester resin derived from fumaric acid, isophthalic acid and a polyol blend of propoxylated bisphenol. These aforementioned unsaturated polyester resins can be utilized, for instance, as a toner binder, especially for xerographic copiers and printers.

In U.S. Pat. No. 4,960,664 there is disclosed a polyester resin derived from an unsaturated dicarboxylic acid, a polybasic carboxylic acid having not less than three carboxylic acid group and a diol component, in particular, an etherified bisphenol. In U.S. Pat. No. 4,804,622, there is disclosed a polyester resin formed by co-condensation of a diol component represented by an bis-alkoxylated bisphenol A structure, a dibasic carboxylic acid, and a tribasic or polybasic carboxylic acid, or trihydroxyl or polyhydroxylic alcohol. Furthermore, in U.S. Pat. No. 5,057,596 there is disclosed a crosslinked polyester resin comprised of a trihydric or higher alcohol or trivalent carboxylic acid, an alicyclic diol and an aromatic diacid. Additionally, in U.S. Pat. No. 5,015,724 there is disclosed a modified polyester produced by co-condensation of a dihydric alcohol, with a tri or higher valent carboxylic acid, and a tri or higher valent alcohol.

Other patents that may be of interest are U.S. Pat. Nos. 4,981,939; 4,049,477; 4,980,448; 4,217,440; 4,788,122; 5,466,554, 5,686,218; 4,988,794; 4,727,011; 4,533,614 and 5,366,841.

Although a number of the aforementioned polyester resins derived from alkoxylated bisphenol A, or etherified diphenol with fumaric acid are known, these resins are typically derived from an alkoxylated bisphenol A, which is derived, for example, from a mixture of monomers prepared by the anionic alkoxylation of bisphenol A with alkylene oxide in the presence of an alkali hydroxide catalyst in a pressurized vessel, and wherein the mixtures obtained, for example, are the alkali, such as sodium, potassium, salts of 4-(2-hydroxyalkyl)-bisphenol A, bis 4,4'-(2-hydroxyalkyl)-bisphenol A, and 4-(2'-hydroxyalkyl-2oxyalkyl)4'-(2-hydroxyalkyl)-bisphenol A.

SUMMARY OF THE INVENTION

It is a feature of the present invention to provide branched polyester resins.

Moreover, it is a feature of the present invention to provide a branched unsaturated polyester resin, especially useful as a xerographic toner binder.

it is another feature to provide a branched unsaturated resin derived from a diacid monomer, and a mixture of bis-alkoxylated bisphenol A with a hydroxyl number of from about 2 to about 4, illustrated herein as Formulas IX, X, XI, XII and XIII.

In yet another feature of the present invention there is provided a branched polyester resin useful as a toner binder, and which toner displays a glass transition of, for example, from about 52° C. to about 65° C., and a gel content of, for example, from about 1 to about 40 percent by weight of resin insoluble in toluene.

Moreover, it is a feature of the present invention to provide a branched unsaturated polyester resin derived from fumaric acid and a mixture of alkoxylated bisphenol A with a hydroxyl number of from about 2 to about 4, illustrated herein as IX, X, XI, XII and XIII.

Furthermore, it is a feature of the present invention to provide a mixture of alkoxylated bisphenol A with a hydroxyl number of from about 2 to about 4 derived from bisphenol A and a mixture of alkylene carbonate and hydroxyalkylene carbonate, and polyesters wherein the branching component is a glycerine carbonate.

It is another feature of this invention to provide an economical process for the preparation of branched polyester resins, such as an unsaturated polyester resin, and which process comprises the alkoxylation of a diol, such as bisphenol A with an alkylene carbonate and hydroxyalkylene carbonate, in the presence of an alkali carbonate, such as potassium carbonate, followed by a subsequent addition thereto of a diacid, such as fumaric acid, to thereby generate the branched polyester resin upon further heating and reducing the pressure.

Yet, it is another feature of this invention to provide a mixture of bis-alkoxylated bisphenol A with a hydroxyl number of from about 2 to about 4, and of the Formulas IX
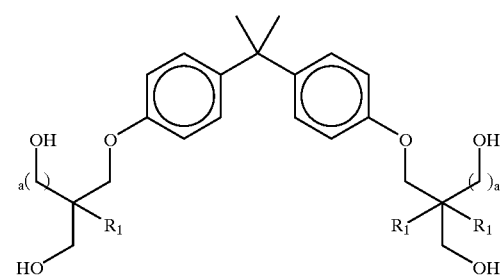

X
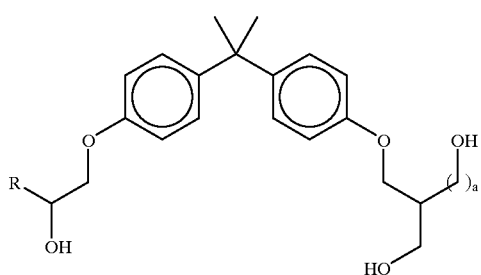

XI
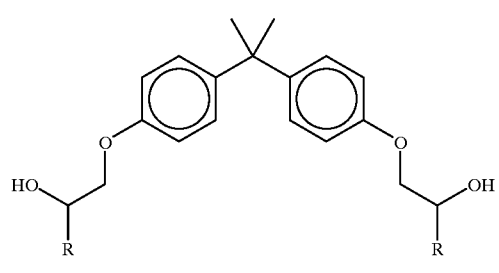

XII
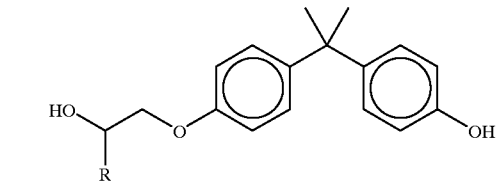

XIII
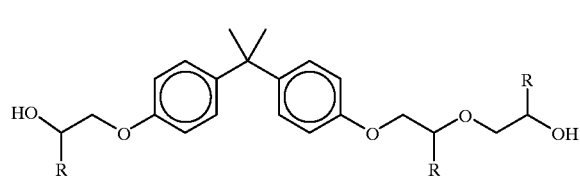

wherein a is an integer of 0 to about 1, R and $R_1$ are a hydrogen alkyl, such as a methyl or an ethyl group.

Aspects of the present invention relate to a branched polyester resin of the Formula

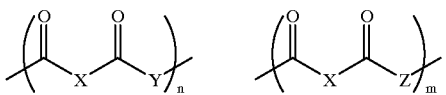

wherein n and m represent the number of randomly repeating segments, and the number of n and m segments in the polyester backbone are each, for example, of from about 10 to about 10,000; X is an alkylene group, an olefinic group, or an arylene; Y is group or radical of I, II, or mixtures thereof; Z is a group or radical of III, IV, or mixtures thereof; and wherein R and $R_1$ are a hydrogen atom or an alkyl group; G is an alkylene or arylene group, and a represents a number, such as 0 or 1.

I
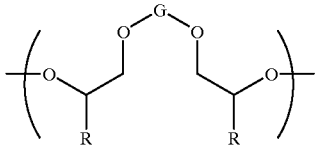

II
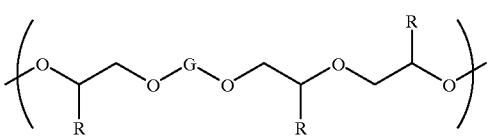

III
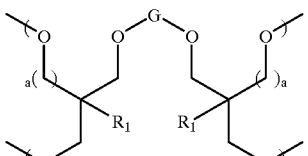

IV
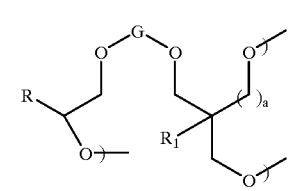

a branched polyester resin wherein the alkylene group X is ethylene, propylene, butylene, pentylene, hexylene, heptylene, octylene, decylene, dodecylene, tridecylene, octadecylene, 2-dodecylethylene, 2-dodecylethylene, or 2-octadecylethylene; a branched polyester resin wherein the olefinic group X is of the formula

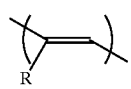

wherein R is hydrogen, methyl, ethyl, propyl, butyl, decyl, dodecyl or octadecyl; a branched polyester wherein the arylene group X contains from about 6 to about 23 carbon atoms; a branched polyester resin wherein the arylene group G is bisphenylene or 2,2-bis-(4-phenylene) propane of the formula

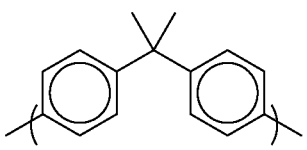

a branched polyester resin wherein the alkylene group G is ethylene, propylene, butylene, pentylene, hexylene, heptylene, octylene, decylene, dodecylene, tridecylene, octadecylene, and 2-dodecylethylene, 2-dodecylethylene, or 2-octadecylethylene; a branched polyester wherein the arylene group G is 1,2-propylene, 1,3-propylene, 1,3-butylene, pentylene, hexylene, diphenylene, neopentylene, 2,2-bis-(4-phenylene) propane, 2,2-bis-(3-phenylene) propane, 2,2-bis-(2-phenylene) propane, 2,2-bis-(5-15 phenylene) propane, bis-(4-phenylene) methane, 1,1-bis-(4-phenylene) ethane, cis-1,4-cyclohexylene, trans-cyclohexylene, cis-1,2-cyclohexylene, trans-1,2-cyclohexylene, or trans-1,3 cyclohexylene; a branched polyester resin wherein Y is

I

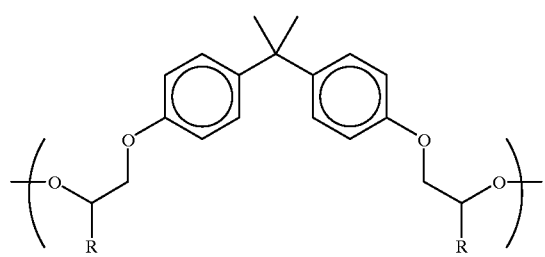

II

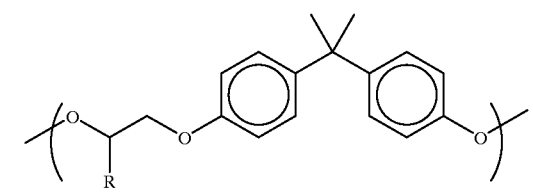

III

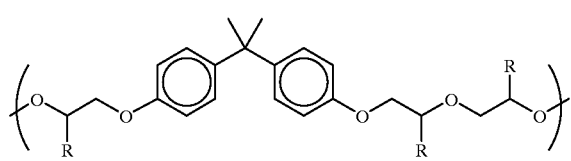

and wherein R is a hydrogen atom, a methyl group or an ethyl group; a branched polyester resin wherein Z is, respectively,

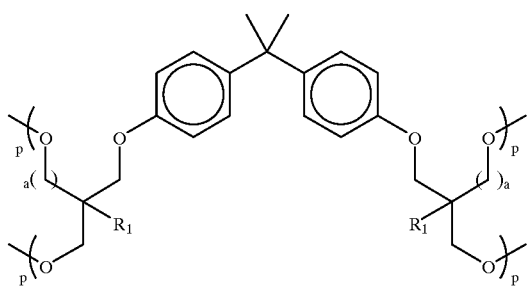

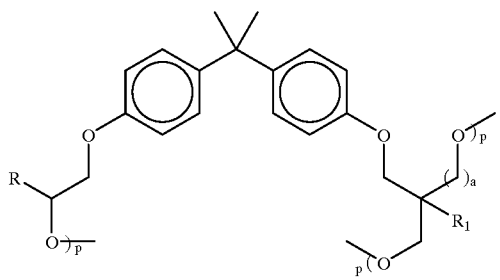

and wherein R and $R_1$ are a hydrogen atom alkyl such as a methyl or ethyl group; a is 0, 1 or 2; and p represents the branching segment; a branched polyester resin wherein the polyester is copoly(propoxylated bisphenol-fumarate)-copoly(trimethylol propoxylated-bisphenol-fumarate), copoly(ethoxylated bisphenol-fumarate)-copoly(trimethylol propoxylated-bisphenol-fumarate), and copoly(butoxylated bisphenol-fumarate)-copoly(trimethylol propoxylated-bisphenol-fumarate), copoly(propoxylated 1,4-diphenol-tumarate)-copoly(glycerinoxylated-diphenol-fumarate), copoly(ethoxylated diphenol-fumarate)-copoly (glycerinoxylated-diphenol-fumarate), copoly (butyloxylated diphenol-fumarate)-copoly(glycerin oxylated-diphenol-fumarate, copoly(propoxylated dihydroxyethane-fumarate)-copoly(glycerinoxylated-dihydroxyethane-fumarate), or copoly(propoxylated dihydroxypropane-fumarate)-copoly(glycerinoxylated-dihydroxypropane-fumarate); a branched polyester resin wherein the polyester is copoly(propoxylated bisphenol-fumarate)- copoly(glycerinoxylated-bisphenol-fumarate), copoly(ethoxylated bisphenol-fumarate)-copoly (glycerinoxylated-bisphenol-fumarate), or copoly (butyloxylated bisphenol-fumarate)-copoly(glycerin oxylated-bisphenol4fumarate); a process for the preparation of the invention branched polyesters which comprises (a) reacting an organic diol in an amount of from about 0.9 to about 1.5 mole equivalents with a cyclic akylene carbonate in an amount of from about 1.5 to about 1.95 mole equivalents, and a cyclic hydroxyalkylene carbonate in an amount of from about 0.05 to about 0.5 mole equivalents in the presence of an alkali carbonate catalyst, and which catalyst is selected in an amount of from about 0.001 to about 0.1 mole equivalents and an antioxidant agent in an amount of from about 0.001 to about 0.01 mole equivalents, and which process includes heating at a temperature of from about 175° C. to about 205° C., and (b) followed by polycondensing with a dicarboxylic acid in an amount of from about 0.95 to about 1.05 mole equivalents, and at a temperature of from about 175° C. to about 205° C.; a process wherein the acid is fumaric acid, malonic acid, itaconic acid, 2-methylitaconic acid, maleic acid, maleic anhydride, adipic acid, succinic acid, suberic acid, 2-ethyl succinic acid, glutaric acid, dodecylsuccinic acid, 2-methyladipic acid, pimelic acid, azelaic acid, sebacic acid, terephthalic acid, isophthalic acid, phthalic acid, 1,2-cyclohexanedioic acid, 1,3-cyclohexanedioic acid, 1,4-cyclohexanedioic acid, dialkyl esters wherein alkyl contains from about 2 to about 22 carbon atoms, and are esters of malonate, succinate, fumarate, itaconate, terephthalate, isophthalate, phthalate, cyclohexanedioate, mixtures thereof, and which diacids are optionally selected in an amount of from about 0.95 mole equivalent to about 1.1 mole equivalents, based on about 1 mole equivalent of organic diol utilized; a process wherein the dicarboxylic acid is fumaric acid; a process wherein the diol is 1,2-propanediol, 1,3-propanediol, 1,3-butanediol, pentylene glycol, hexylene glycol, diphenol, neopentyl glycol, diethylene glycol, dipropylene glycol, 2,2-bis-(4-hydroxy phenyl) propane, 2,2-bis-(3-hydroxy phenyl) propane, 2,2-bis-(2-hydroxy phenyl) propane, 2,2-bis-(5-hydroxy phenyl) propane, bisphenol A, ethoxylated bisphenol A, bis-(4-hydroxy phenyl) methane, 1,1-bis-(4-hydroxy phenyl) ethane, cis-1,4-dihydroxy-cyclohexane, trans-1,4-dihydroxy-cyclohexane, cis-1,2-dihydroxy-cyclohexane, trans-1,2-dihydroxy-cyclohexane, trans-1,3-dihydroxy-cyclohexane, cis-1,3-dihydroxy-cyclohexane, which diol is optionally selected in an amount of from about 0.90 mole equivalents to about 1.1 mole equivalents, based on about 1 mole equivalent of dicarboxylic acid utilized; a process wherein the diol is 2,2-bis-(4-hydroxy phenyl) propane or bisphenol A; a process wherein the cyclic alkylene carbonate is ethylene carbonate, propylene carbonate, butylene carbonate, or mixtures thereof; a process wherein the alkali carbonate catalyst is potassium carbonate, sodium carbonate, rubidium carbonate, cesium carbonate, beryllium carbonate, magnesium carbonate, calcium carbonate, strontium carbonate, or barium carbonate and mixtures thereof, and optionally which alkali carbonate amount is based on about 1 mole equivalent of organic diol utilized; a process wherein the alkali carbonate is potassium carbonate; a process wherein the cyclic hydroxyalkylene carbonate is glycerine carbonate, trimethylol propane carbonate, 4-hydroxymethyl-1,3-dioxolan-2-one, 4-hydroxyethyl-1,3-dioxolan-2-one or mixtures thereof, and which hydroxy alkylene carbonate amount is based on about 1 mole equivalent of organic diol utilized; a process wherein the cyclic hydroxyalkylene carbonate is represented as

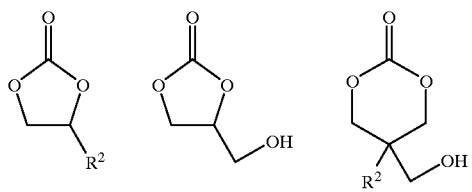

wherein $R_2$ is a hydrogen atom, a methyl group or an ethyl group; a toner comprised of the invention branched polyester and a colorant; a toner which contains a wax component; a toner which contains a charge additive; a toner wherein the toner contains a wax component and a charge additive; a toner which contains surface additives; a toner wherein the surface additives are comprised of silicas, metal oxides, fatty acid salts, or mixtures thereof; a developer comprised of toner and carrier; a developer wherein the carrier is comprised of a core with a coating or mixture of coatings thereover; a branched polyester which possesses a molecular weight $M_w$ of from about 10,000 to about 200,000 grams per mole, a number average molecular weight of from about 5,000 grams per mole to about 50,000 grams per mole, and a polydispersity of from about 2 to about 50; a polyester which possesses a weight average molecular weight Mw of from about 6,000 to about 300,000 grams per mole, a number average molecular weight Mn of from about 4,000 grams per mole to about 100,000 grams per mole, and a polydispersity of from about 2 to about 100; a branched polyester resin of the Formula

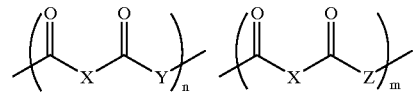

wherein n and m represent the number of segments; X is an alkylene group of from about 2 to about 20 carbon atoms, an olefinic group, or an arylene group of from about 6 to about 18 carbon atoms, Y is an organic radical of I, II, or mixtures thereof; and Z is an organic radical of III, IV, or mixtures thereof; wherein R and $R_1$ are each independently a hydrogen group or an alkyl group, and a represents the number of segments.

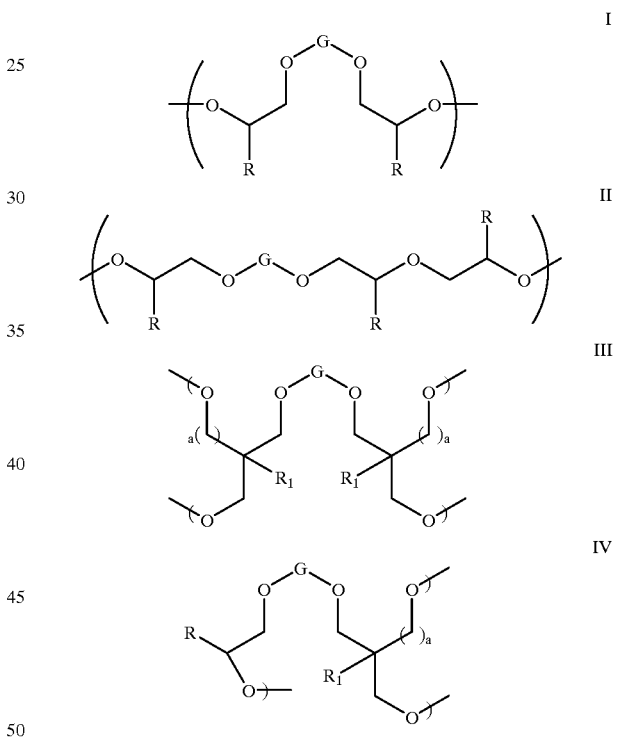

a branched polyester resin wherein the mixture of I and II contains from about 0 to about 100 weight percent of I, and from about 0 to about 100 weight percent of II; a branched polyester resin wherein the mixture of III and IV contains from about 0 to about 100 weight percent of III, and from about 0 to about 100 weight percent of IV; a branched polyester wherein the arylene group X is 1,4-phenylene, 1,3-phenylene, 1,2-phenylene, anthralene, or phenanthralene; a branched polyester resin wherein arylene is 1,4-phenylene, 1,3-phenylene, 1,2-phenylene, anthralene, phenanthralene, or perylene; a branched polyester resin wherein n represents a number of from about 1,000 to about 7,000; a branched polyester resin wherein n represents a number of from about 1,000 to about 5,000; a branched polyester resin wherein m represents a number of from about 25 to about 7,000; a branched polyester resin wherein m represents a number of from about 1,000 to about 5,000; a branched polyester resin wherein X is alkylene with from about 2 to about 25 carbon atoms; a branched polyester resin wherein X is an olefinic group with from about 2 to about 30 carbon atoms; a branched polyester resin wherein X is arylene with from about 7 to about 36 carbon atoms; a branched polyester resin wherein Y is I; a branched polyester resin wherein Y is II, or Y is comprised of a mixture of I and II; a branched polyester resin wherein Z is I; a branched polyester resin wherein Z is II; a branched polyester resin wherein R and $R_1$ are each independently alkyl; a branched polyester resin wherein alkyl contains from 1 to about 25 carbon atoms; a branched polyester resin wherein G is alkylene with about 2 to about 25 carbon atoms; a branched polyester resin wherein G is arylene with from about 7 to about 36 carbon atoms; a branched polyester resin wherein a is between 0 and about 1; a process for the preparation of the invention branched polyester which comprises reacting an organic diol with a cyclic alkylene carbonate, a dicarboxylic acid, and a cyclic hydroxyalkylene carbonate in the presence of an alkali carbonate catalyst; a process wherein the diol is selected in an amount of from about 0.95 to about 1.05 mole equivalents, the dicarboxylic acid is selected in an amount of from about 1.5 to about 1.95 mole equivalents, the cyclic hydroxyalkylene carbonate is selected in an amount of from about 0.05 to about 0.5 mole equivalents, and the catalyst is selected in an amount of from about 0.001 to about 0.1 mole equivalent and further optionally including an anti-oxidant agent in an amount of from about 0.001 to about 0.01 mole equivalents; a process which includes heating at a temperature of from about 175° C. to about 205° C. for a duration of from about 1 to about 6 hours, followed by polycondensing with a dicarboxylic acid in an amount of from about 0.95 to about 1.05 mole equivalents, and at a temperature of from about 175° C. to about 205° C., for a duration of from about 1 to about 6 hours, and a pressure of from about 760 Torrs to about 1 Torr; a branched polyester resin of the Formula

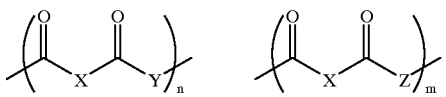

wherein n and m each represent segments of the polymer backbone randomly distributed in the polyester; X is an alkylene group, an olefinic group, or an arylene; Y is comprised of a mixture of I and II; Z is comprised of a mixture of III and IV; R and $R_1$ are each independently hydrogen or alkyl; G is alkylene or arylene and a is 0 or 1.

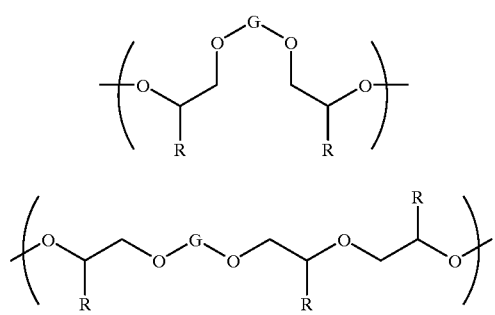

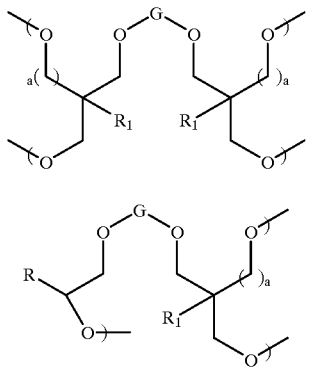

a polyester wherein X alkylene contains from about 2 to about 30 carbon atoms; X arylene contains from about 7 to about 36 carbon atoms; alkyl contains from about 1 to about 30 carbon atoms; G alkylene contains from about 2 to about 30 carbon atoms; and G arylene contains from about 7 to about 36 carbon atoms; a polyester wherein a is 0 (zero); a polyester wherein a is 1; and a polyester wherein Y is comprised of a mixture of I and II, and Z is comprised of a mixture of III and IV.

Examples of specific branched polyester resins of the present invention are copoly(propoxylated bisphenol-fumarate)-copoly(glycerinoxylated-bisphenol-fumarate), copoly(ethoxylated bisphenol-fumarate)-copoly (glycerinoxylated-bisphenol4fumarate), copoly (butyloxylated bisphenol-fumarate)-copoly(glycerin oxylated-bisphenol-fumarate), copoly (propoxylated bisphenol-fumarate)-copoly(trimethylol propoxylated-bisphenol-fumarate), copoly(ethoxylated bisphenol-fumarate)-copoly (trimethylol propoxylated-bisphenol-fumarate), and copoly(butoxylated bisphenol-fumarate)-copoly (trimethylol propoxylated-bisphenol-fumarate).

The invention branched unsaturated polyester resin can be generated, for example, from the reaction of a dicarboxylic acid, such as fumaric acid, and a mixture of bis-alkoxylated bisphenol A with a hydroxyl number of from about 2 to about 4, by a condensation process with the removal of water. More specifically, the mixture of bis-alkoxylated bisphenol A is prepared by loading a 2 liter Hoppes reactor equipped with a mechanical stirrer and distillation apparatus with from about 1 to about 1.05 mole equivalent of a diol, such as bisphenol A, with from about 1.5 to about 1.9 mole equivalent of an alkylene carbonate, such as propylene carbonate, with from about 0.1 to about 0.5 mole equivalent of a hydroxyalkylene carbonate, such as glycerine carbonate, with from about 0.001 to about 0.1 mole equivalent of catalyst, such as potassium carbonate, and an antioxidant, such as hydroquinone, in an amount of from about 0.001 to 0.1 mole equivalent. The reactor contents are then heated to a temperature of from about 170° C. to about 190° C. for a duration of, for example, from about 2 to about 6 hours with stirring at, for example, from about 50 to about 250 revolutions per minute. During this time, carbon dioxide is evolved. The mixture is then cooled to room temperature, about 25° C. to about 30° C., thereby resulting in a mixture of bis-alkoxylated bisphenol A with a hydroxyl number of from about 2 to about 4. The branched unsaturated polyester resin is prepared by loading a 2 liter Hoppes reactor equipped with a mechanical stirrer and distillation apparatus with from about 1 to about 1.05 mole equivalent of the obtained mixture of bis-alkoxylated bisphenol A with a hydroxyl number of from about 2 to about 4, and from about 0.95 to about 1.05 mole equivalent of an unsaturated diacid such as fumaric acid. The contents of the reactor are then heated to a temperature of from about 170° C. to about 190° C. for a suitable time, such as a duration of from about 1 to about 3 hours, after which the pressure is reduced from, for example, about atmospheric pressure to about 3 Torrs, during which water is removed through the distillation apparatus, and the temperature is increased, for example, to about 200° C. during a suitable period of time, for example from about 1 to about 6 hours. The product is then discharged through a bottom drain valve and allowed to cool to room temperature, about 25° C. to about 30° C.

Various diol reactants can be selected such as bisphenol A, 1,2-propanediol, 1,3-propanediol, 1,3-butanediol, pentylene glycol, hexylene glycol, diphenol, neopentyl glycol, diethylene glycol, dipropylene glycol, 2,2-bis-(4-hydroxy phenyl) propane, 2,2-bis-(3-hydroxy phenyl) propane, 2,2-bis-(2-hydroxy phenyl) propane, 2,2-bis-(3-hydroxy phenyl) propane, 2,2-bis-(5-hydroxy phenyl) propane, bisphenol A, ethoxylated bisphenol A, bis-(4-hydroxy phenyl) methane, 1,1-bis-(4-hydroxy phenyl) ethane, cis-1,4-dihydroxy-cyclohexane, trans-1,4-dihydroxy-cyclohexane, cis-1,2-dihydroxy-cyclohexane, trans-1,2-dihydroxy-cyclohexane, trans-1,3-dihydroxy-cyclohexane, cis-1,3-dihydroxy-cyclohexane, and mixtures thereof, and which diols are selected in an amount of, for example, from about 1.0 mole equivalent to about 1.1 mole equivalent, based on about 1 mole equivalent of the dicarboxylic acid reactant utilized. Examples of diacids or esters of diacids include dicarboxylic acids, such as those selected from the group consisting of fumaric acid, malonic acid, itaconic acid, 2-methylitaconic acid, maleic acid, maleic anhydride, adipic acid, succinic acid, suberic acid, 2-ethyl succinic acid, glutaric acid, dodecylsuccinic acid, 2-methyladipic acid, pimelic acid, azelaic acid, sebacic acid, terephthalic acid, isophthalic acid, phthalic acid, 1,2-cyclohexanedioic acid, 1,3-cyclohexanedioic acid, 1,4-cyclohexanedioic acid, dialkyl esters wherein alkyl contains from about 2 to about 22 carbon atoms, like esters of malonate, succinate, fumarate, itaconate, terephthalate, isophthalate, phthalate, cyclohexanedioate, mixtures thereof, and which diacids are selected, for example, in an amount of from 0.95 mole equivalent to about 1.1 mole equivalents, based on about 1 mole equivalent of the diol reactant utilized.

Various cyclic alkylene carbonate components can be selected such as ethylene carbonate, propylene carbonate, or butylene carbonate, or mixtures thereof, and which alkylene carbonate can be selected, for example, in an amount of from about 1.50 mole equivalents to about 1.90 mole equivalents, based on about 1 mole equivalent of the organic diol. Examples of alkali catalysts that can be selected for the formation of the invention branches polyester are potassium carbonate, sodium carbonate, rubidium carbonate, cesium carbonate, beryllium carbonate, magnesium carbonate, calcium carbonate, strontium carbonate, manganese carbonate, or barium carbonate and mixture thereof, and which alkali carbonates can be selected, for example, in an amount of, for example, from about 0.001 mole equivalent to about 0.01 mole, based on about 1 mole equivalent of organic diol utilized. Cyclic hydroxyalkylene carbonates component examples that can be selected include glycerine carbonate, trimethylolpropane carbonate, 4-hydroxymethyl-1,3-dioxalen-2-one, and which are, for example, selected in an amount of from about 0.1 mole equivalent to about 0.15 mole equivalent, based on about 1 mole equivalent of organic diol utilized.

Antioxidants that can be selected for the processes of the present invention, and which function, for example, primarily as stability components during the process such that the unsaturated groups do not crosslink prematurely include phenolic compounds such as hydroquinone, 2,6-di-t-butyl-4-methylphenol, 2,4-di-t-butylphenol, methyl-hydroquinone, t-butyl-hydroquinone and the like, and which antioxidant can be selected in an amount of, for example, from about 0.001 to about 0.01, and preferably from about 0.001 to about 0.005 mole percent equivalent of the polyester or reaction components.

For generation of the toner, various known suitable colorants, such as dyes, pigments, and mixtures thereof and present in the toner containing the branched polyester of the present invention, and which colorant is present in an effective amount of, for example, from about 1 to about 25 percent by weight of the toner, and preferably in an amount of from about 2 to about 12 weight percent, include carbon black like REGAL 330®; magnetites, such as Mobay magnetites MO8029™, MO8060™; Columbian magnetites; MAPICO BLACKS™ and surface treated magnetites; Pfizer magnetites CB4799™, CB5300™, CB5600™, MCX6369™; Bayer magnetites, BAYFERROX 8600 ™, 8610™; Northern Pigments magnetites, NP-604™, NP-608™; Magnox magnetites TMB-100™, or TMB-104™; and the like. As colored pigments, there can be selected cyan, magenta, yellow, red, green, brown, blue or mixtures thereof. Specific examples of pigments include phthalocyanine HELIOGEN BLUE L6900™, D6840™, $D_{7080}$™, D7020™, PYLAM OIL BLUE™, PYLAM OIL YELLOW™, PIGMENT BLUE 1™ available from Paul Uhlich & Company, Inc., PIGMENT VIOLET 1™, PIGMENT RED 48™, LEMON CHROME YELLOW DCC 1026™, E.D. TOLUIDINE RED™ and BON RED C™ available from Dominion Color Corporation, Ltd., Toronto, Ontario, NOVAPERM YELLOW FGL™, HOSTAPERM PINK E™ from Hoechst, and CINQUASIA MAGENTA™ available from E.l. DuPont de Nemours & Company, and the like. Generally, colorants that can be selected are black, cyan, magenta, or yellow, and mixtures thereof. Examples of magentas are 2,9-dimethyl-substituted quinacridone and anthraquinone dye identified in the Color Index as CI 60710, CI Dispersed Red 15, diazo dye identified in the Color Index as CI 26050, CI Solvent Red 19, and the like. Illustrative examples of cyans include copper tetra(octadecyl sulfonamido) phthalocyanine, x-copper phthalocyanine pigment listed in the Color Index as CI 74160, CI Pigment Blue, and Anthrathrene Blue, identified in the Color Index as CI 69810, Special Blue X-2137, and the like; while illustrative examples of yellows are diarylide yellow 3,3-dichlorobenzidene acetoacetanilides, a monoazo pigment identified in the Color Index as CI 12700, CI Solvent Yellow 16, a nitrophenyl amine sulfonamide identified in the Color Index as Foron Yellow SE/GLN, Cl Dispersed Yellow 33 2,5-dimethoxy-4-sulfonanilide phenylazo-4'-chloro-2,5-dimethoxy acetoacetanilide, and Permanent Yellow FGL. Colored magnetites, such as mixtures of MAPICO BLACK™, and cyan components may also be selected as colorants. Other known colorants can be selected, such as Levanyl Black A-SF (Miles, Bayer) and Sunsperse Carbon Black LHD 9303 (Sun Chemicals), and colored dyes such as Neopen Blue (BASF), Sudan Blue OS (BASF), PV Fast Blue B2G01 (American Hoechst), Sunsperse Blue BHD 6000 (Sun Chemicals), Irgalite Blue BCA (Ciba-Geigy), Paliogen Blue 6470 (BASF), Sudan III (Matheson, Coleman, Bell), Sudan II (Matheson, Coleman, Bell), Sudan IV (Matheson, Coleman, Bell), Sudan Orange G (Aldrich), Sudan Orange 220 (BASF), Paliogen Orange 3040 (BASF), Ortho Orange OR 2673 (Paul Uhlich), Paliogen Yellow 152, 1560 (BASF), Lithol Fast Yellow 0991 K (BASF), Paliotol Yellow 1840 (BASF), Neopen Yellow (BASF), Novoperm Yellow FG 1 (Hoechst), Permanent Yellow YE 0305 (Paul Uhlich), Lumogen Yellow D0790 (BASF), Sunsperse Yellow YHD 6001 (Sun Chemicals), Suco-Gelb L1250 (BASF), Suco-Yellow D1355 (BASF), Hostaperm Pink E (American Hoechst), Fanal Pink D4830 (BASF), Cinquasia Magenta (DuPont), Lithol Scarlet D3700 (BASF), Toluidine Red (Aldrich), Scarlet for Thermoplast NSD PS PA (Ugine Kuhlmann of Canada), E. D. Toluidine Red (Aldrich), Lithol Rubine Toner (Paul Uhlich), Lithol Scarlet 4440 (BASF), Bon Red C (Dominion Color Company), Royal Brilliant Red RD-8192 (Paul Uhlich), Oracet Pink RF (Ciba-Geigy), Paliogen Red 3871K (BASF), Paliogen Red 3340 (BASF), and Lithol Fast Scarlet L4300 (BASF). Dye examples are known and include food dyes, and the like.

Examples of positive or negative charge enhancing additives that can be selected for incorporation into the toner compositions of the present invention, preferably in an amount of about 0.1 to about 10, and more preferably about 1 to about 3 percent by weight include quaternary ammonium compounds inclusive of alkyl pyridinium halides; alkyl pyridinium compounds, reference U.S. Pat. No. 4,298,672, the disclosure of which is totally incorporated hereby by reference; organic sulfate and sulfonate compositions, U.S. Pat. No. 4,338,390, the disclosure of which is totally incorporated hereby by reference; cetyl pyridinium tetrafluoroborates; distearyl dimethyl ammonium methyl sulfate; aluminum salts such as BONTRON E84™ or E88™ (Hodogaya Chemical); and the like.

There can also be blended with the toner compositions of the present invention toner additives, such as waxes, compatibilizers, and external additive particles including flow aid additives, which external additives are usually present on the surface thereof. Examples of these additives include metal oxides like titanium oxide, tin oxide, mixtures thereof, and the like, colloidal silicas, such as AEROSIL®, metal salts and metal salts of fatty acids inclusive of zinc stearate, aluminum oxides, cerium oxides, and mixtures thereof, which additives are generally present in an amount of from about 0.1 percent by weight to about 5 percent by weight, and preferably in an amount of from about 0.1 percent by weight to about 1 percent by weight. Several of the aforementioned additives are illustrated in U.S. Pat. Nos. 3,590,000 and 3,800,588, the disclosures which are totally incorporated herein by reference. Also, there can be selected as additives the coated silicas of copending applications U.S. Ser. No. 132,185; U.S. Ser. No. 132,623, and U.S. Pat. No. 6,004,714, the disclosures of which are totally incorporated herein by reference.

Developers include mixtures of the toners illustrated herein and carrier particles. Developer compositions can be prepared by mixing the toner with known carrier particles, including coated carriers, such as steel, ferrites, and the like, reference U.S. Pat. Nos 4,937,166 and 4,935,326, the disclosures of which are totally incorporated herein by reference, for example from about 2 weight percent toner concentration to about 9 weight percent toner concentration. The carriers can include coatings thereon, such as those illustrated in the U.S. Pat. Nos. 4,937,166 and 4,935,326 patents, and other known coatings. There can be selected a single coating polymer, or a mixture of polymers. Additionally, the polymer coating, or coatings may contain conductive components therein, such as carbon black, in an amount, for example, of from about 10 to about 70 weight percent, and preferably from about 20 to about 50 weight percent. Coating examples include polymers of fluorocarbons, methacrylates, acrylates, styrenes, styrene copolymers and the like; and carrier cores include iron, steel, ferrites, and the like.

Imaging methods are also envisioned with the toners and developers of the present invention, reference for example a number of the patents mentioned herein, and U.S. Pat. Nos. 4,265,990; 5,648,539; 5,648,542; 4,585,884; 4,584,253 and 4,563,408, the disclosure of which is totally incorporated herein by reference.

The branched invention polyesters are generally present in the toner in an amount of from about 40 to about 98 percent by weight, and more preferably from about 70 to about 98 percent by weight. The polyester toner resins of the present invention can be melt blended or otherwise mixed with from about 2 to about 10 percent by weight of a colorant, with from about 0 to about 2 percent by weight of a charge additives, with from about 0 to about 6 percent by weight of a wax, and optionally subsequently blended with from about 0 to about 4 percent by weight of a flow additives. The resultant product can then be pulverized by known methods such as milling to form toner particles. The toner particles resulting preferably have an average volume particle diameter of about 5 to about 25, more preferably about 5 to about 15 microns.

The branched polyester resin in preferred embodiments possess, for example, a number average molecular weight ($M_n$), as measured by gel permeation chromatography (GPC), in the range typically of from about 1,000 to about 20,000, and preferably from about 2,000 to about 50,000. The weight average molecular weight ($M_w$) of the branched polyester is in the range typically of from about 2,000 to about 40,000, and preferably from about 4,000 to about 150,000, as determined by Gel Permeation Chromatography, using polystyrene standards. The molecular weight distribution ($M_w/M_n$) of the branched polyester is, for example, in the range typically from about 1.5 to about 6, and preferably from about 2 to about 4. The onset glass transition temperature (Tg) of the resin as measured by differential scanning calorimeter (DSC) for preferred embodiments is, for example, in the range typically of from about 50° C. to about 70° C., and preferably from about 52° C. to about 67° C.

All amounts, ranges, and other values recited herein represent examples, and values outside the ranges disclosed may be selected in embodiments of the present invention.

The following Examples are being provided to further illustrate various species of the present invention, it being noted that these Examples are intended to illustrate and not limit the scope of the present invention.

EXAMPLE I

There was prepared branched unsaturated polyester resin, copoly(propoxylated bisphenol co-fumarate)-co copoly (gycerineoxylated bisphenol co-fumarate) derived from 1 mole equivalent of fumaric acid, 1.94 mole equivalent of propylene carbonate, 0.06 mole equivalent of glycerine carbonate and 1 mole equivalent of bisphenol A.

A 2 liter Hoppes Reactor equipped with a vacuum line, and distillation apparatus was charged with 750 grams of bisphenol A obtained from Shell Chemical, 674 grams of propylene carbonate obtained as JEFFSOL PC from Huntsman Chemicals, 20.8 grams of glycerine carbonate obtained as JEFFSOL GC from Huntsman Chemicals and 1.5 grams of potassium carbonate. The mixture was heated to 180° C. over a 3 hour period with stirring and maintained at that temperature for an additional 4 hours. The reactor was then charged with 385.5 grams of fumaric acid (resin grade) from Bartek Ingredients Ink Company, 1.5 grams of butylstannoic acid obtained as FASCAT 4100 from Elf Atochem, and 220 milligrams of hydroquinone. The temperature was then raised to 190° C. over a 2 hour period, and the pressure was then reduced from 760 Torr to 6.5 Torr over a 3 hour period, wherein water was collected in the distillation receiver. The resin, copoly(propoxylated bisphenol A co-fumarate)-copoly(glycerinoxylated bisphenol A co-fumarate), was then discharged through the bottom drain valve, and exhibited a glass transition temperature (onset) of 60.2° C. determined by using the DuPont differential scanning calorimeter and obtained during the second heating cycle of the resin at a heating rate of 10° C. per minute. The melt index of this resin was found to be 13.6 grams per 10 minutes using a 2.16 kilograms weight at a temperature of 117° C. The softening point of this resin determined using the Mettler softening point apparatus was found to be 116° C. The weight average molecular weight was found to be 20,700 grams/mole and the number average molecular weight was found to be 4,600 grams as measured by the gel permeation chromatography and using tetrahydrofuran as the solvent and polystyrene as the standard. The acid number of this resin product was 27 milligrams of KOH per gram of sample.

EXAMPLE II

There was prepared branched unsaturated polyester resin, copoly(propoxylated bisphenol co-fumarate)-co copoly (gycerineoxylated bisphenol co-fumarate) derived from 1 mole equivalent of fumaric acid, 1.94 mole equivalent of propylene carbonate, 0.06 mole equivalent of glycerine carbonate and 1 mole equivalent of bisphenol A.

A 2 liter Hoppes Reactor equipped with a vacuum line, and distillation apparatus was charged with 750 grams of bisphenol A obtained from Shell Chemical, 674 grams of propylene carbonate obtained as JEFFSOL PC from Huntsman Chemicals, 20.8 grams of glycerine carbonate obtained as JEFFSOL GC from Huntsman Chemicals and 1.5 grams of potassium carbonate. The mixture was heated to 180° C. over a 3 hour period with stirring and maintained at that temperature for an additional 4 hours. The reactor was then charged with 385.5 grams of fumaric acid (resin grade) from Bartek Ingredients Ink Company, 1.5 grams of butylstannoic acid obtained as FASCAT 4100 from Elf Atochem, and 220 milligrams of hydroquinone. The temperature was then raised to 190° C. over a 2 hour period, and the pressure was then reduced from 760 Torr to 6.5 Torr over a 4 hour period, wherein water was collected in the distillation receiver. The resin, copoly(propoxylated bisphenol A co-fumarate)-copoly(glycerinoxylated bisphenol A co-fumarate), was then discharged through the bottom drain valve, and exhibited a glass transition temperature (onset) of 64° C. using the DuPont differential scanning calorimeter and obtained during the second heating cycle of the resin at a heating rate of 10° C. per minute. The melt index of this resin was found to be 1.89 grams per 10 minutes using a 2.16 kilograms weight at a temperature of 137° C. The softening point of this resin using the Mettler softening point apparatus was found to be 116° C. The weight average molecular weight was found to be 98,100 grams/mole and the number average molecular weight was found to be 26,900 grams as measured by the gel permeation chromatography and using tetrahydrofuran as the solvent and polystyrene as the standard. The acid number of this resin product was 18 milligrams of KOH per gram of sample.

EXAMPLE III

A 9 micron toner comprised of a branched unsaturated polyester resin of Example I, 5 percent by weight of carbon black and 5 percent of Visco 660 P wax was prepared as follows. The above branched polyester resin (270 grams), 15 grams of carbon black (REGAL® 330), 15 grams of polypropylene wax (Visco 660P, a polypropylene wax obtained from Sanyo Chemical) and 9 grams of a glycidyl methacrylate copolymer wax compatibilizer available from ELF Atochem as AX-8840 were weighed and dry-blended using a tumbler for 45 minutes. The dry blend was then melt mixed together on the APV extruder, which was set at 300° F. The extrudate strand was cooled down in a water bath, and then dried and crushed into fine particles (95 percent by weight passing through 3.36 millimeters sieve). The resulting crushed toner particles were then ground into fine toner particles using a jet mill (0202 Jet-O-Mizer), which toner was then classified using an A 12 ACUCUT Classifier. The resulting toner product was comprised of 87 percent by weight of the above branched polyester, 5 percent by weight of carbon black (REGAL® 330), 5 percent by weight of wax (660P) and 3 percent by weight of compatibilizer (AX-8840). The volume median diameter of the toner product was 9.0 microns with 11 percent by number of fines between 1.2 to 4 microns. The toner tribo was found to be 5.3 microcoulombs/gram as measured on a semi-automatic Tribo Blow-Off Apparatus, and using the Xerox Corporation 5090 Carrier, which carrier in embodiments is comprised of a steel core containing thereover a coating of polyvinylidene fluoride and polymethylmethacrylate.

EXAMPLE IV

A 9.7 micron toner comprised of the branched unsaturated polyester resin of Example II, 5 percent by weight of carbon black, and 5 percent of Visco 660 P wax was prepared as follows. The above branched polyester resin (270 grams), 15 grams of carbon black (REGAL® 330), 15 grams of polypropylene wax (Visco 660P Sanyo Chemical) and 9 grams of a glycidyl methacrylate copolymer wax compatibilizer (AX-8840 ELF Atochem) were weighed and dry blended using a tumbler for 45 minutes. The dry blend was then melt mixed together on the APV extruder, which was set at 300° F. The extrudate strand was cooled down in a water bath, and then dried and crushed into fine particles (95 percent by weight passing through a 3.36 millimeters sieve). The resulting crushed toner particles were then ground into fine toners using a jet mill (0202 Jet-O-Mizer), which toner was then classified using an A12 ACUCUT Classifier. The resulting toner product was comprised of 87 percent by weight of branched polyester, 5 percent by weight of carbon black (REGAL® 330), 5 percent by weight of wax (660P) and 3 percent by weight of compatibilizer (AX-8840). The volume median diameter of the toner product was 9.7 microns with 14 percent by number of fines being between 1.2 to 4 microns. The toner tribo was found to be 5.8 microcoulombs/gram as measured on a semi-automatic Tribo Blow-Off Apparatus, and using the carrier of Example IV.

Developer compositions were also prepared by roll milling the above toners, 3 parts by weight, with 100 parts by weight of a 90 micron diameter ferrite carrier core with a coating, 0.55 percent by weight of a polymer of methylmethacrylate (80.4 percent), vinyl triethoxysilane (5 percent) and styrene (14.1 percent). Unfused copies were then produced using a custom made imaging apparatus similar to the Xerox Corporation 9200 imaging apparatus with the fusing system disabled.

Other modifications of the present invention may occur to those skilled in the art subsequent to a review of the present application and these modifications, including equivalents thereof, are intended to be included within the scope of the present invention.

What is claimed is:

1. A toner comprised of a branched polyester and a colorant and wherein said polyester is of the formula

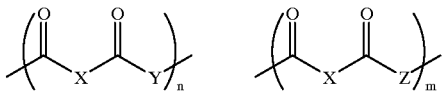

wherein n and m represent the number of randomly repeating segments, and the number of n and m segments in the polyester backbone are each of from about 10 to about 10,000; X is an alkylene group, an olefinic group, or an arylene; Y is group or radical of I, II, or mixtures thereof; Z is a group or radical of III, IV, or mixtures thereof; and wherein R and $R_1$ is a hydrogen atom or an alkyl group; G is an alkylene or arylene group, and a is 0 or 1.

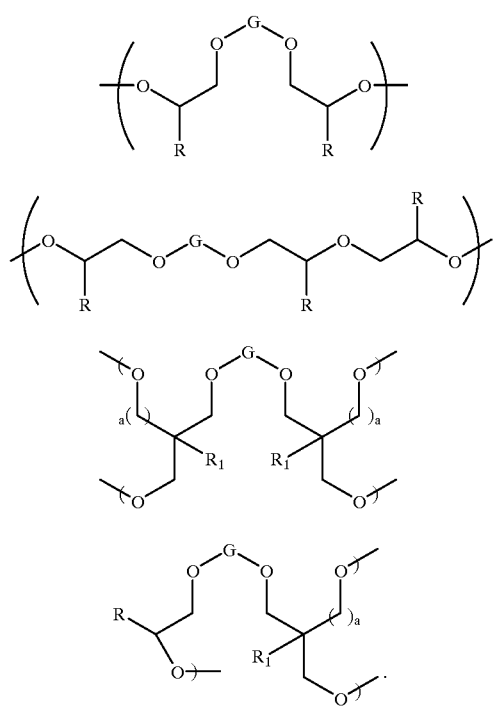

2. A toner in accordance with claim 1 wherein the toner contains a wax component.

3. A toner in accordance with claim 1 wherein the toner contains a charge additive.

4. A toner in accordance with claim 1 wherein the toner contains a wax component and a charge additive.

5. A toner in accordance with claim 1 wherein the toner contains surface additives.

6. A toner in accordance with claim 5 wherein said additives are comprised of silicas, metal oxides, fatty acid salts, or mixtures thereof.

7. A developer comprised of the toner of claim 1 and carrier.

8. A developer in accordance with claim 7 wherein said carrier is comprised of a core with a coating or mixture of coatings thereover.

9. A toner in accordance with claim 1 wherein alkylene X is ethylene, propylene, butylene, pentylene or hexylene.

10. A toner in accordance with claim 1 wherein arylene G is bisphenylene.

11. A toner in accordance with claim 1 wherein said polyester is copoly(propoxylated bisphenol-fumarate)-copoly(trimethylol propoxylated-bisphenol-fumarate), copoly(ethoxylated bisphenol-fumarate)-copoly(trimethylol propoxylated-bisphenol-fumarate), and copoly(butoxylated bisphenol-fumarate)-copoly(trimethylol propoxylated-bisphenol-fumarate), copoly(propoxylated 1,4-diphenol-fumarate)-copoly(glycerinoxylated-diphenol-fumarate), copoly(ethoxylated diphenol-fumarate)-copoly(glycerinoxylated-diphenol-fumarate), copoly(butyloxylated diphenol-fumarate)-copoly(glycerin oxylated-diphenol-fumarate, copoly(propoxylated dihydroxyethane-fumarate)-copoly(glycerinoxylated-dihydroxyethane-fumarate), or copoly(propoxylated dihydroxypropane-fumarate)-copoly(glycerinoxylated-dihydroxypropane-fumarate).

12. A toner in accordance with claim 1 wherein said polyester is copoly(propoxylated bisphenol-fumarate)-copoly(glycerinoxylated-bisphenol-fumarate), copoly(ethoxylated bisphenol-fumarate)-copoly(glycerinoxylated-bisphenol-fumarate), or copoly (butyloxylated bisphenol-fumarate)-copoly(glycerin oxylated-bisphenol-fumarate).

13. A toner in accordance with claim 1 wherein said colorant is black, red, green, yellow, blue or mixture thereof.

* * * * *